United States Patent
Bordawekar et al.

(10) Patent No.: US 7,313,563 B2
(45) Date of Patent: Dec. 25, 2007

(54) METHOD, SYSTEM AND RECORDING MEDIUM FOR MAINTAINING THE ORDER OF NODES IN A HEIRARCHICAL DOCUMENT

(75) Inventors: Rajesh Bordawekar, Yorktown Heights, NY (US); Yi Chen, Philadelphia, PA (US); George A. Mihaila, White Plains, NY (US); Sriram Padmanabhan, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 10/629,744

(22) Filed: Jul. 30, 2003

(65) Prior Publication Data

US 2005/0028091 A1   Feb. 3, 2005

(51) Int. Cl.
*G06F 7/00* (2006.01)
*G06F 17/00* (2006.01)

(52) U.S. Cl. .............. 707/101; 707/100; 715/513; 715/514

(58) Field of Classification Search .............. 707/1–10, 707/100, 200, 101; 715/513, 514
See application file for complete search history.

(56) References Cited

U.S. PATENT DOCUMENTS

| 6,247,016 B1* | 6/2001 | Rastogi et al. ............ 707/101 |
| 6,408,300 B1* | 6/2002 | Bergman et al. ........... 707/101 |
| 6,694,323 B2* | 2/2004 | Bumbulis ................... 707/101 |
| 6,804,677 B2* | 10/2004 | Shadmon et al. ........... 707/101 |
| 6,889,226 B2* | 5/2005 | O'Neil et al. .............. 707/100 |
| 2002/0087571 A1* | 7/2002 | Stapel et al. ................ 707/100 |
| 2003/0172352 A1* | 9/2003 | Kashima et al. ............ 715/513 |

OTHER PUBLICATIONS

Wang et. al ,"ViST: A Dynamic Index Method for Querying XML Data by Tree Structure", ACM SIGMOD, Jun. 2003 (12 pages).*
Peter Gulutzan, Trudy Pelzer, "SQL Performance Tuning", Addison Wesley Professional, Sep. 10, 2002 (3 pages).*
Cohen, et al., "Labeling Dynamic XML Trees", In Proc. ACM Symposium on Principles of Database Systems (PODS), Jun. 2002.
Abiteboul, et al., "Compact labeling schemes for ancestor queries", In Proc. ACM-SIAM Symposium on Discrete Algorithms (SODA), Jan. 2001.
Alstrup, et al., "Improved labeling scheme for ancestor queries", In Proc. ACM-SIAM Symposium on Discrete Algorithms (SODA), Jan. 2002.

(Continued)

*Primary Examiner*—Hosain Alam
*Assistant Examiner*—Shew-Fen Lin
(74) *Attorney, Agent, or Firm*—Jesse L. Abzug, Esq.; McGinn IP Law Group, PLLC

(57) ABSTRACT

A method, a system and recording medium for maintaining the order of nodes in a hierarchical document. The method may select the maximum and the minimum number of children for each node, build an auxiliary ordered tree having at least as many leaves as atoms within the hierarchical document based upon the selected maximum and minimum number of children for each node, attach the atoms to the leaves of the auxiliary ordered tree, and label each of the nodes in the auxiliary ordered tree.

20 Claims, 12 Drawing Sheets

OTHER PUBLICATIONS

Kaplan, et al., "A comparison of labeling schemes for ancestor queries", In Proc. ACM-SIAM Symposium on Discrete Algorithms (SODA), Jan. 2002.

Santoro, et al., "Labeling and implicit routing in networks", In Computer Journal, 1985.

Dietz, et al., "Two Algorithms for Maintaining Order in a List", In Proc. 19th Annual ACM Symposium on Theory of Computing, pp. 365-372, Springer, 1987.

Dietz, "Maintaining Order in a Linked List", In Proc. 14th Annual ACM Symposium on Theory of Computing, pp. 122-127, May 1982.

Willard, "Good Worst-case Algorithms for Inserting and Deleting Records in Dense Sequential Files", In Proc. ACM International Conference on Management of Data (SIGMOD), pp. 251-260, 1986.

Li, et al., "Indexing and Querying XML Data for Regular Path Expressions", In VLDB Journal, pp. 361-370, 2001.

Zhang, et al., "On Supporting Containment Queries in Relational Database Management Systems", In Proc. ACM International Conference on Management of Data (SIGMOD), 2001.

Bruno, et al., "Holistic Twig Joins: Optimal XML Pattern Matching", In Proc. ACM International Conference on Management of Data (SIGMOD), pp. 310-321 2002.

Grust, "Accelerating XPath Location Steps", In Proc. ACM International Conference on Management of Data (SIGMOD), pp. 109-120, 2002.

Bayer, et al., "Organization and Maintenance of Large Ordered Indices", Mathematical and Information Sciences Report No. 20, Mathematical and Information Sciences Laboratory, Boeing Scientific Research Laboratories, pp. 107-141, Jul. 1970.

* cited by examiner

```
<PurchaseOrder>
  <Buyer>
    <Name>John Smith</Name>
  </Buyer>
   <LineItems>
     <Item>
       <Name>ThinkPad T20</Name>
       <Description>
        This laptop is the <Bold>best value</Bold> in its class
       </Description>
       <:Price>$1999</Price>
     </Item>
     <Item>
       <Name>NetVista Desktop</Name>
       <:Price>$999</Price>
     </Item>
   <LineItems>
</PurchaseOrder>
```

FIG.3

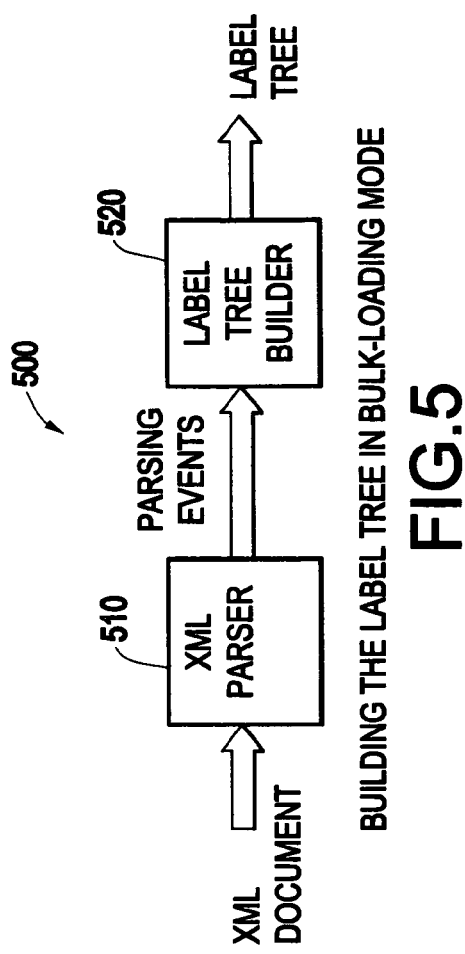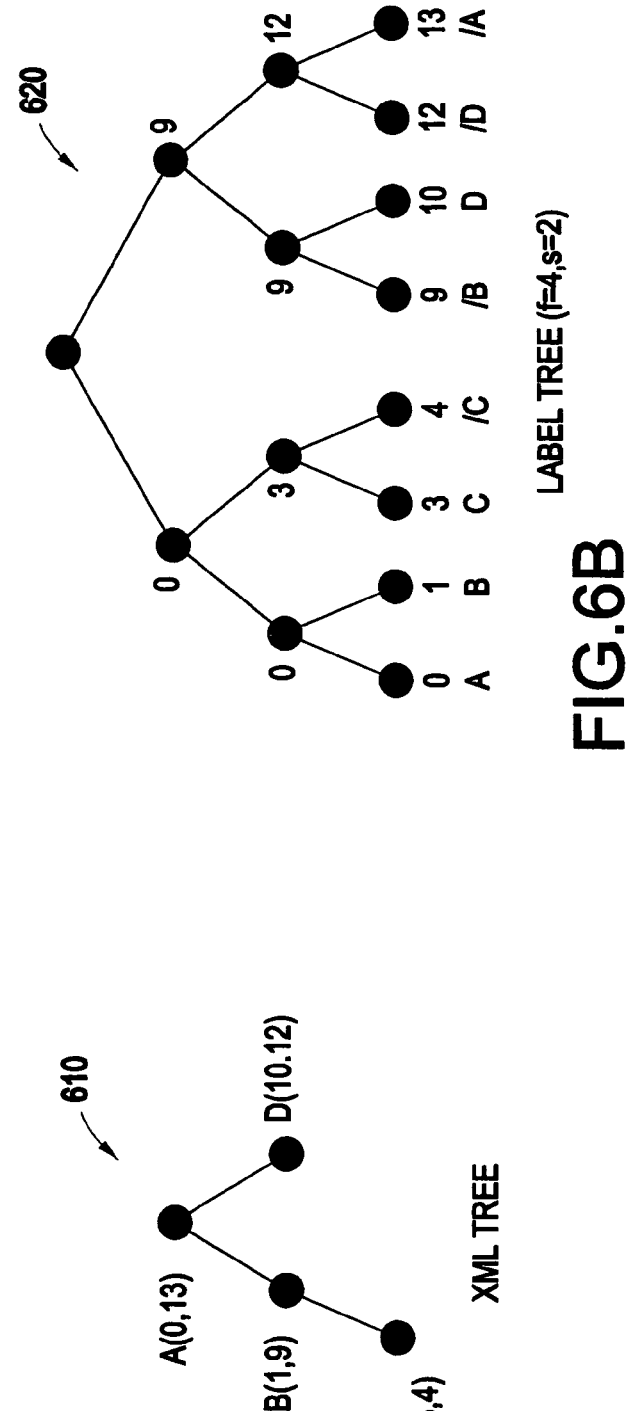
FIG.5 BUILDING THE LABEL TREE IN BULK-LOADING MODE
FIG.6A XML TREE
FIG.6B LABEL TREE (f=4, s=2)

MAINTAINING THE LABEL TREE IN RESPONSE TO UPDATES

LABEL TREE MAINTENANCE ALGORITHM

LABEL TREE (f=4,s=2)

XML TREE

LABEL TREE (f=4,s=2) (BEFORE INSERTION)

XML TREE (BEFORE INSERTION)

LABEL TREE (f=4,s=2)
(AFTER INSERTION)

XML TREE (AFTER INSERTION)

METHOD, SYSTEM AND RECORDING MEDIUM FOR MAINTAINING THE ORDER OF NODES IN A HEIRARCHICAL DOCUMENT

BACKGROUND OF THE INVENTION

Field of the Invention

An exemplary embodiment of the invention generally relates to the maintenance of order of nodes in a hierarchical document. More particularly, an exemplary embodiment of the invention relates to a method and system for maintaining the order of nodes in a hierarchical document.

With the advent of XML as a data representation format, there is an increasing need for robust, high performance XML database systems. Most of the recent work focuses on efficient XML query processing while updates have received less attention, by comparison.

SUMMARY OF THE INVENTION

In order to speed up query processing, various labeling schemes have been proposed. However, the vast majority of these schemes have very bad update performance.

What is needed is an order-preserving labeling scheme having a low update cost and a minimum of bits per label.

In a first exemplary aspect of the present invention, a method of maintaining the order of nodes in a hierarchical document includes selecting a first parameter corresponding to a selected maximum number of children for each node for an auxiliary ordered tree, selecting a second parameter corresponding to a selected minimum number of children for each node for the auxiliary ordered tree, building the auxiliary ordered tree having at least as many leaves as atoms within the hierarchical document based upon the first and second parameters, attaching the atoms to the leaves of the auxiliary ordered tree, and labeling each of the nodes in the auxiliary ordered tree.

In a second exemplary aspect of the present invention, a method of updating an auxiliary ordered tree having at least as many leaves as atoms within a hierarchical document based upon a selected maximum number of children for each node and a selected minimum number of children for each node. The method includes receiving a request to insert the hierarchical document with a new atom at specific position, inserting a new leaf in the auxiliary ordered tree based on the specific position of the corresponding atom in the hierarchical document, searching for the highest ancestor node of the new leaf that has a number of leaves that equals or exceeds the selected maximum number of leaves, if no ancestor is found that equals or exceeds the selected maximum number of leaves then re-label the sub-tree rooted at the parent node of the new leaf; if an ancestor node is found that has a number of leaves that equals or exceeds the selected maximum number of leaves, then determining whether the ancestor node is the root node, if the ancestor node is the root node, then create a new root having a predetermined number of children, if the ancestor node is not the root node, then split the ancestor node into complete sub-trees that have the same leaf sequence as the ancestor node's sub-tree, and reassign labels in a top-down fashion in the sub-tree rooted at the parent of the ancestor node.

In a third exemplary aspect of the present invention, a method of optimizing an auxiliary ordered tree having at least as many leaves as atoms within a hierarchical document, the shape of the auxiliary ordered tree being based upon a selected maximum number of children for each node and a selected minimum number of children for each node. The method includes adjusting the maximum number of children for each node and the selected minimum number of children for each node of the auxiliary ordered tree based upon application requirements regarding one of update cost, total cost of queries and updates, and the size of the labels.

In a fourth exemplary aspect of the present invention, a method of encoding an auxiliary ordered tree having at least as many leaves as atoms within a hierarchical document, the shape of the auxiliary ordered tree being based upon a selected maximum number of children for each node and a selected minimum number of children for each node. The method includes minimizing space requirements using a virtual tree.

In a fifth exemplary aspect of the present invention, a system for maintaining the order of nodes in a hierarchical document includes means for selecting a first parameter corresponding to a selected maximum number of children for each node for an auxiliary ordered tree, means for selecting a second parameter corresponding to a selected minimum number of children for each node for an auxiliary ordered tree, means for building the auxiliary ordered tree having at least as many leaves as atoms within the hierarchical document based upon the first and second parameters, means for attaching the atoms to the leaves of the auxiliary ordered tree, and means for labeling each of the nodes in the auxiliary ordered tree.

In a sixth exemplary aspect of the present invention, a recording medium storing a program for making a computer maintain the order of nodes in an hierarchical document. The program includes instructions for selecting a first parameter corresponding to a selected maximum number of children for each node for an auxiliary ordered tree, instructions for selecting a second parameter corresponding to a selected minimum number of children for each node for an auxiliary ordered tree, instructions for building the auxiliary ordered tree having at least as many leaves as atoms within the hierarchical document based upon the first and second parameters, instructions for attaching the atoms to the leaves of the auxiliary ordered tree, and instructions for labeling each of the nodes in the auxiliary ordered tree.

In a seventh exemplary aspect of the present invention, a system for updating an auxiliary ordered tree having at least as many leaves as atoms within a hierarchical document based upon a selected maximum number of children for each node and a selected minimum number of children for each node, includes means for receiving a request to insert the hierarchical document with a new atom at specific position, means for inserting a new leaf in the auxiliary ordered tree based on the specific position of the corresponding atom in the hierarchical document, means for searching for the highest ancestor node of the new leaf that has a number of leaves that equals or exceeds the selected maximum number of leaves, if no ancestor is found that equals or exceeds the selected maximum number of leaves then means for re-labeling the sub-tree rooted at the parent node of the new leaf, if an ancestor node is found that has a number of leaves that equals or exceeds the selected maximum number of leaves, then means for determining whether the ancestor node is the root node, if the ancestor node is the root node, then means for creating a new root having a predetermined number of children, if the ancestor node is not the root node, then means for splitting the ancestor node into complete sub-trees that have the same leaf sequence as the ancestor node's sub-tree, and means for reassigning labels in a top-down fashion in the sub-tree rooted at the parent of the ancestor node.

In an eighth exemplary aspect of the present invention, a recording medium storing a program for making a computer update an auxiliary ordered tree having at least as many leaves as atoms within a hierarchical document based upon a selected maximum number of children for each node and a selected minimum number of children for each node, includes instructions for receiving a request to insert the hierarchical document with a new atom at specific position, instructions for inserting a new leaf in the auxiliary ordered tree based on the specific position of the corresponding atom in the hierarchical document, instructions for searching for the highest ancestor node of the new leaf that has a number of leaves that equals or exceeds the selected maximum number of leaves, if no ancestor is found that equals or exceeds the selected maximum number of leaves then instructions for re-labeling the sub-tree rooted at the parent node of the new leaf, if an ancestor node is found that has a number of leaves that equals or exceeds the selected maximum number of leaves, then instructions for determining whether the ancestor node is the root node, if the ancestor node is the root node, then instructions for creating a new root having a predetermined number of children, if the ancestor node is not the root node, then instructions for splitting the ancestor node into complete sub-trees that have the same leaf sequence as the ancestor node's sub-tree, and instructions for reassigning labels in a top-down fashion in the sub-tree rooted at the parent of the ancestor node.

An exemplary embodiment of the present invention provides an order-preserving labeling scheme having a low update cost and that minimizes the number of bits per label.

BRIEF DESCRIPTION OF THE DRAWINGS

The foregoing and other purposes, aspects and advantages will be better understood from the following detailed description of exemplary embodiments of the invention with reference to the drawings, in which:

FIG. 3 illustrates an exemplary XML document;

FIG. 5 illustrates an exemplary embodiment of the invention that maintains the order of nodes in a hierarchical document;

FIG. 6A illustrates an exemplary XML document tree;

FIG. 6B illustrates an exemplary embodiment of an auxiliary ordered tree in accordance with the present invention;

DETAILED DESCRIPTION OF EXEMPLARY EMBODIMENTS OF THE INVENTION

Figure 2:
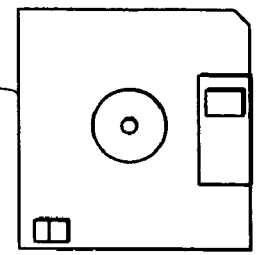
FIG. 2 illustrates an exemplary recording medium that stores instructions for maintaining the order of nodes in a hierarchical document.

Referring now to the drawings, and more particularly to FIGS. 1-14, there are shown exemplary embodiments of the method and structures according to the present invention.

Figure 1:
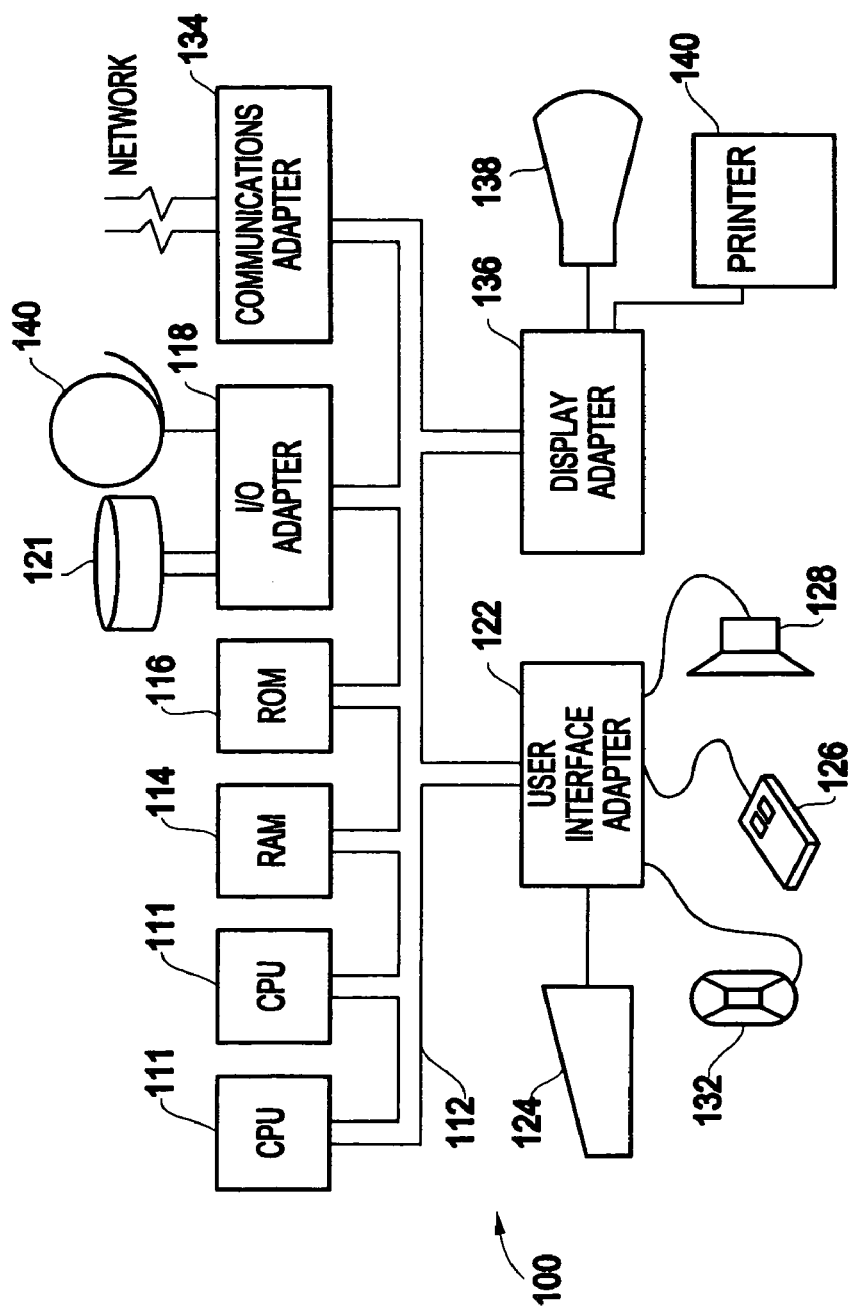
FIG. 1 illustrates an exemplary hardware configuration for maintaining the order of nodes in a hierarchical document.

FIG. 1 illustrates a typical hardware configuration of a system for maintaining the order of nodes in a hierarchical document 100 for use with the invention and which preferably has at least one processor or central processing unit (CPU) 111.

The CPUs 111 are interconnected via a system bus 112 to a random access memory (RAM) 114, read-only memory (ROM) 116, input/output (I/O) adapter 118 (for connecting peripheral devices such as disk units 121 and tape drives 140 to the bus 112), user interface adapter 122 (for connecting a keyboard 124, mouse 126, speaker 128, microphone 132, and/or other user interface device to the bus 112), a communication adapter 134 for connecting an information handling system to a data processing network, the Internet, an Intranet, a personal area network (PAN), etc., and a display adapter 136 for connecting the bus 112 to a display device 138 and/or printer 140.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 111, as represented by the fast-access storage for example. Alternatively, the instructions may be contained in another signal-bearing media, such as a magnetic data storage diskette 200 (FIG. 2), directly or indirectly accessible by the CPU 111.

Whether contained in the diskette 200, the computer/CPU 111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With the advent of XML as a data representation format, there is an increasing need for robust, high performance XML database management systems. Historically, XML is the successor of earlier document markup languages such as SGML and HTML, and as such, XML is primarily a document format and, therefore, is fundamentally different from the type of relational data that may be encountered in typical business applications.

Among the most prominent distinctive features of XML is an irregular, self-descriptive, potentially recursive structure, and an implicit order among data elements which is the so-called document order.

FIG. 3 shows an example of an XML document. In FIG. 3, the words enclosed in angle brackets are referred to as "tags." More precisely, the "begin tags" are of the form "<A>" and the "end tags" are of the form "</A>". The begin and end tags need to be properly nested.

In addition to tags there is free text, that can be divided into text "segments" (a maximal sequence of consecutive characters not containing any tags). For example, as shown in FIG. 3, "ThinkPad T20","John Smith", "This laptop is the", "best value", and "in its class" are free text.

Figure 4:
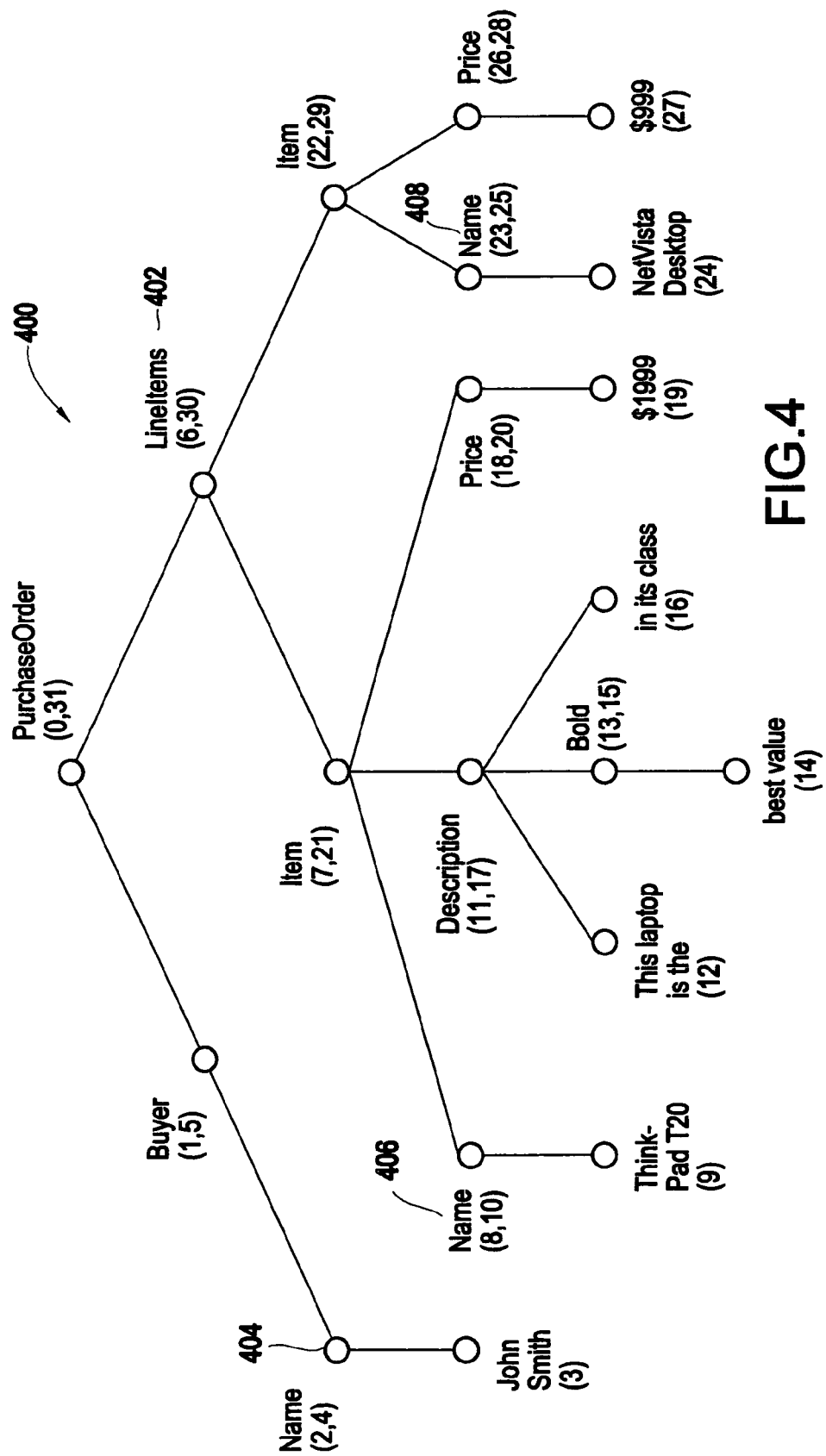
FIG. 4 illustrates a conventional tree representation for the XML document of FIG. 3.

It is common practice to represent the content of an XML document using a tree diagram. An example of a tree diagram for the XML document of FIG. 3 is shown in FIG. 4.

The nodes in the tree diagram 400 of the XML document that are annotated with tag names are called "element" nodes and the others (annotated with text segments) are called "text" nodes. The numbers associated with each node will be described later.

While this detailed description does not include illustrations having other features defined in the XML standard such as attributes, comments, processing instructions, and namespace declarations. Other features may be treated in a similar fashion as elements and text segments.

An XML database should be able to efficiently retrieve ordered XML fragments according to patterns specified in a query language like XPath or XQuery. Since XML needs to operate at the item level, an XML database has to decompose documents into atomic data items (e.g., elements, attributes, text segments, etc.). XML also needs a mechanism for recording the relative position of these data items because it needs to preserve document order.

One conventional method for maintaining document order, which also helps in query processing, assigns ordered labels to data items. Thus, if we treat an XML document as an ordered tree T, the method traverses T (depth-first) and assigns ordered labels to nodes. Each node x receives two labels, the first label, $B_x$, is assigned when node x is first visited, and the second label, $E_x$, is assigned when node x is exited. Therefore, this method assigns two different labels to element nodes and two identical labels to text nodes.

The labels of every node of the tree shown in FIG. 4 are the numbers in the parenthesis annotated to the node. Since the two labels for text nodes are identical, they are shown as a single number for simplicity.

The advantage of labeling every node in the tree is apparent when processing XPath queries using the child axis or the descendant axis. A child axis query only retrieves the immediate children of a node while a descendant axis query retrieves all of the direct and indirect descendants of a node.

An example of a child axis XPath query is "/PurchaseOrder/Buyer/Name" which means: "find the name of the buyer listed in this purchase order."

An example of a descendant axis XPath query is "//LineItems//name" which means: "find all the names of items occurring anywhere inside this purchase order."

An XPath navigation query of a tree that uses this labeling scheme is converted to an interval containment query based upon the following observation: for every two nodes x and y, x is an ancestor of y if and only if the interval $(B_x, E_x)$ includes the interval $(B_y, E_y)$, or equivalently $B_x < B_y$ and $E_y < E_x$.

For example, as shown in FIG. 4, node 402 has the tag "LineItems" with labels (6,30), and there are three nodes 404, 406 and 408 that have the tag "Name" and labels (2,4), (8,10) and (23,25), respectively. By examining the labels of nodes 406 and 408, it can be detected that node 402 with tag "LineItems" is an ancestor of nodes 406 and 408 without navigating the XML tree: 6<8 and 30>10, 6<23 and 30>25.

Since checking interval containment of the labels is much more efficient than navigating the XML tree to answer an XPath query, this labeling scheme can be advantageous for query processing. However, the vast majority of the proposed labeling schemes have poor performance when there is an update to an XML document. The naive approach of assigning labels from the integer domain, in sequential order, leads to re-labeling of half the nodes on average, even for a single node insertion to an XML document.

Alternatively, when labeling an XML document tree, gaps can be left between successive labels. However, these gaps may be filled as additional nodes are inserted into the XML document tree.

An exemplary embodiment of the present invention assigns and dynamically maintains these gaps to ensure optimal use of the tree.

An exemplary embodiment of the invention provides an order-preserving labeling scheme with a O(log N) amortized update cost and O(log N) bits per label (where N is the number of nodes of the XML tree).

Consider an XML document D viewed in its textual representation as a linear ordered list of tags (either begin tags or end tags) and text segments (called atoms): $L_D = (a_1, a_2, \ldots a_N)$. As shown in FIG. 5, an exemplary embodiment of the present invention 500 includes an XML parser 510 which assigns a numeric label $l_i$ to each atom $a_i$ that reflects the order of the atoms in the list.

In order to compute these labels, this exemplary embodiment of the invention 500 includes a label tree builder 520 that builds an auxiliary ordered tree, that may be called a label tree, with at least N leaves (where N is the number of atoms) and attaches the atoms to the first N leaves, starting from the leftmost leaf.

This exemplary embodiment of the label tree builder 520 builds the tree so that all of the leaves are at the same level (i.e. the number of edges from the root to any leaf node is the same).

There are two exemplary parameters, f and s, for the label tree, which may be selected and which may determine the shape of the tree. For example, the fanout of every node x in the label tree may be bounded by $f/s \leq \text{fanout}(x) < f$.

For any node x in the label tree, an exemplary embodiment of the invention selects values for f and s (as explained later) and assigns a label N(x) recursively in a top-down fashion to each document atom in accordance with the following labeling algorithm:

$$N(\text{root}) = 0; \qquad (1)$$

$$N(x) = N(y) + i \cdot (f-1)^{h(x)}; \text{ and} \qquad (2)$$

$$0 \leq i < f \qquad (3)$$

Where:

x is the i$^{th}$ child of y;

f is the maximum fanout (maximum number of children per node); and h(x) is the height of node x (number of edges from node x to a leaf node).

An exemplary embodiment of the present invention may also assign labels to the XML atoms based upon the labels assigned to their corresponding leaves in the label tree.

This exemplary embodiment of the present invention preserves the order of the XML atoms, that is, the following Proposition holds:

Proposition 1: Let x be a leaf in a label tree corresponding to an XML atom $a_i$, and y be a leaf corresponding to atom $a_j$. Then as appears before $a_j$ in the XML document if and only if N(x)<N(y).

Initially, an exemplary embodiment of the present invention builds a label tree for an existing XML document during a "bulk-loading mode" which uses the algorithm described above. To maximize the capability to accommodate further insertions, an exemplary embodiment of the present invention builds a label tree based upon a complete f/s-ary tree.

FIG. 6A shows an XML tree 610 and FIG. 6B shows a corresponding label tree 620 (having f=4, s=2) built by the bulk-loading method in accordance with an exemplary embodiment of the present invention. For purposes of illustration, all the nodes in this XML tree 610 are element nodes.

Figure 7:
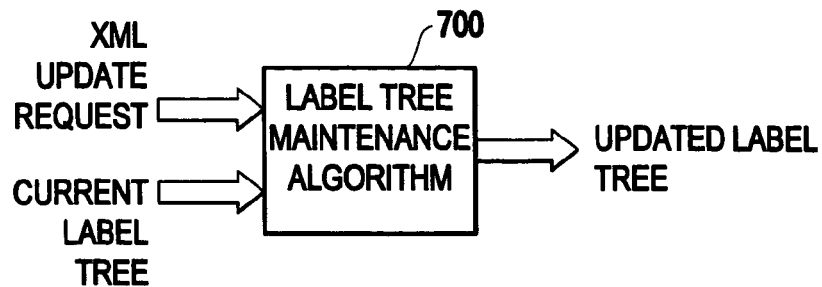
FIG. 7 illustrates an exemplary embodiment of the invention that updates an auxiliary ordered tree in accordance with the present invention.

A bulk-loading algorithm shown in FIG. 5 builds the label tree of FIG. 6B in this exemplary embodiment. The label tree 620 shown in FIG. 6B is a complete tree and, therefore, all its leaves are at the same level. An exemplary embodiment of the present invention also maintains the label tree created during the bulk loading mode. For example, as shown in FIG. 7, a label tree maintenance algorithm 700 in accordance with an exemplary embodiment of the present invention may receive an XML Update Request and will provide an Updated Label Tree, based on the Current Label Tree.

For the purposes of this detailed description, for every internal node x, c(x) denotes the number of children of node x and l(x) denotes the number of leaves in the sub-tree rooted at x.

Figure 8:
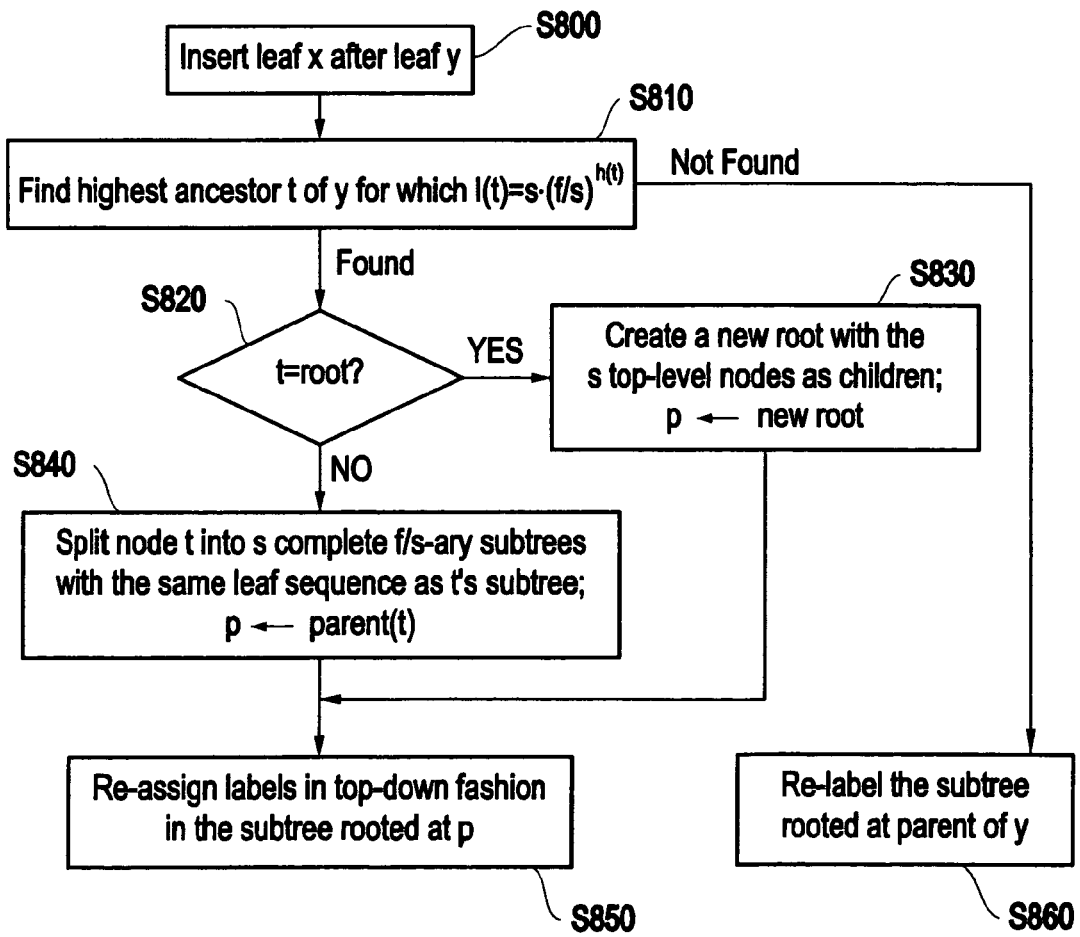
FIG. 8 illustrates an exemplary control routine for maintaining the order of nodes in a hierarchical document in accordance with the present invention.

FIG. 8 outlines an exemplary embodiment of a label tree maintenance algorithm in accordance with the present invention. The algorithm starts at step S800 where the control routine receives a command to insert leaf x after leafy. The control routine then continues to step S810.

In order to distribute the labels in a balanced manner, an exemplary embodiment of the invention limits the maximum number of leaves that each internal node t may have in its sub-tree in according to:

$$L_{max}(t) = s \cdot (f/s)^{h(t)} \quad (4)$$

When a leaf node x is inserted in the label tree, l(t) increases by one for every ancestor node t of node x, thus, in step S810, shown in FIG. 8, an exemplary embodiment of the present invention searches for the highest ancestor node t for which the following holds true (step S810):

$$L(t) = L_{max}(t) \quad (5)$$

If no such node t exists ("Not found" in step S810), then the control routine continues to step S860 and re-labels all of node x's siblings (sub-tree rooted at parent of node y) according to the labeling algorithm described above to assign a label to node x.

Figure 9B:
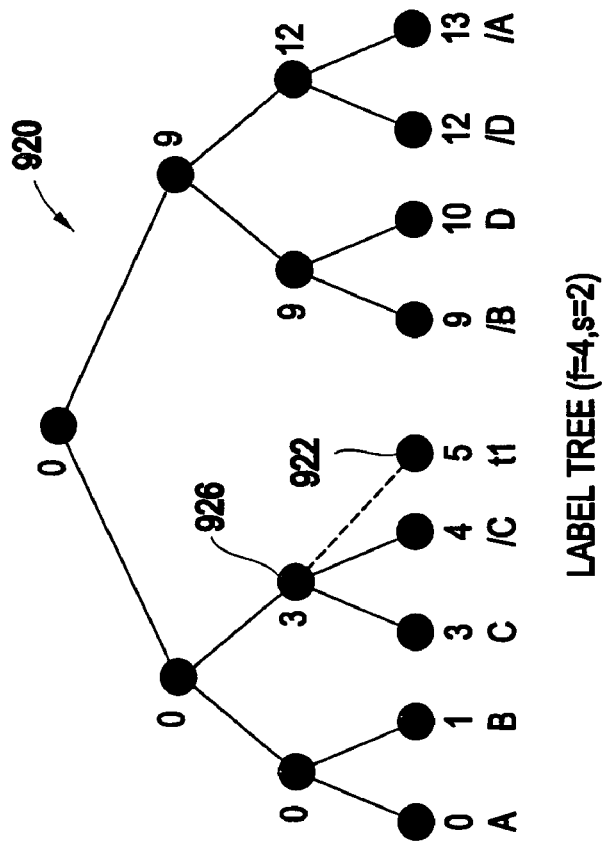
FIG. 9B illustrates another exemplary embodiment of an auxiliary ordered tree in accordance with the present invention.
Figure 9A:
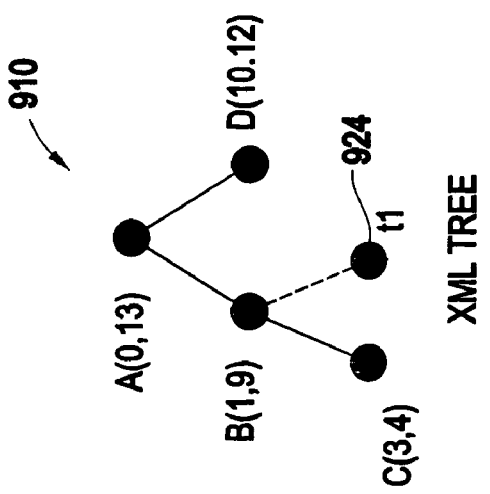
FIG. 9A illustrates another exemplary XML document tree.

For example, FIG. 9B shows an exemplary embodiment of a label tree 920 with a text node "t1" 924 being inserted as the right sibling of a node tagged by "C" in XML tree 910 of FIG. 9A. In the label tree 920 of FIG. 9B, this insertion is illustrated by a leaf insertion 922 after the leaf labeled "/C."

The insertion is represented by dotted lines in FIGS. 9A and 9B.

Since nodes at height 1 can accommodate s·(f/s)=f=4 leaves, this leaf insertion does not cause its parent node "3" 926 to split. In this case, only the siblings of the new leaf 922 may need to be relabeled.

Otherwise, if in step S810 the control routine determines that such a node t does exist ("Found") the control routine continues to step S820. At step S820, the control routine determines if node t is the root node. If not, then the control routine continues to step S840 where node t is split into s nodes and replaces its sub-tree with s complete f/s-ary sub-trees with height h(t) and with the same leaf sequence as the original sub-tree. The control routine then continues to step S850 where re-labeling of the sub-tree rooted at node t's parent is performed.

Figure 10B:
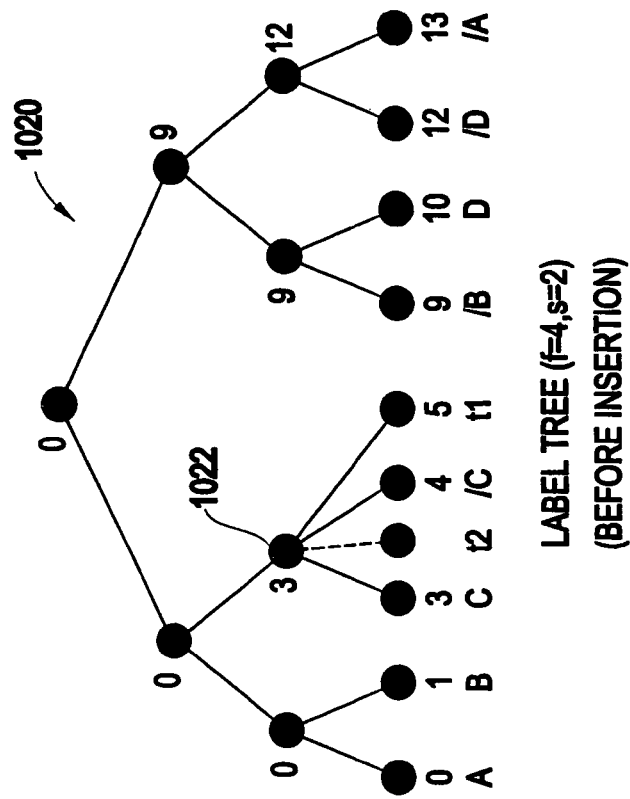
FIGS. 10B and 10D illustrate yet another exemplary embodiment of an auxiliary ordered tree in accordance with the present invention.
Figure 10A:
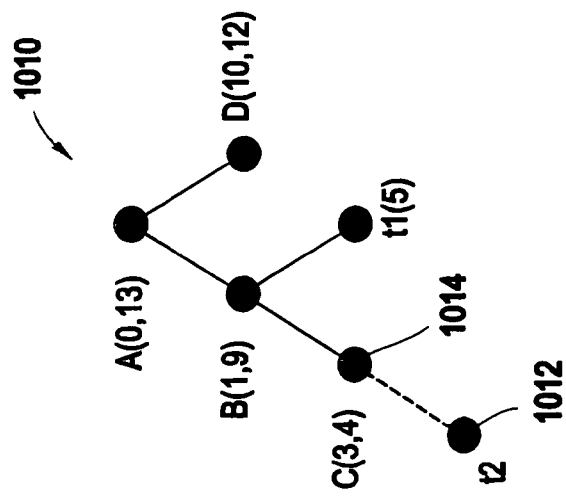
FIGS. 10A and 10C illustrate yet another exemplary XML document tree.
Figure 10D:
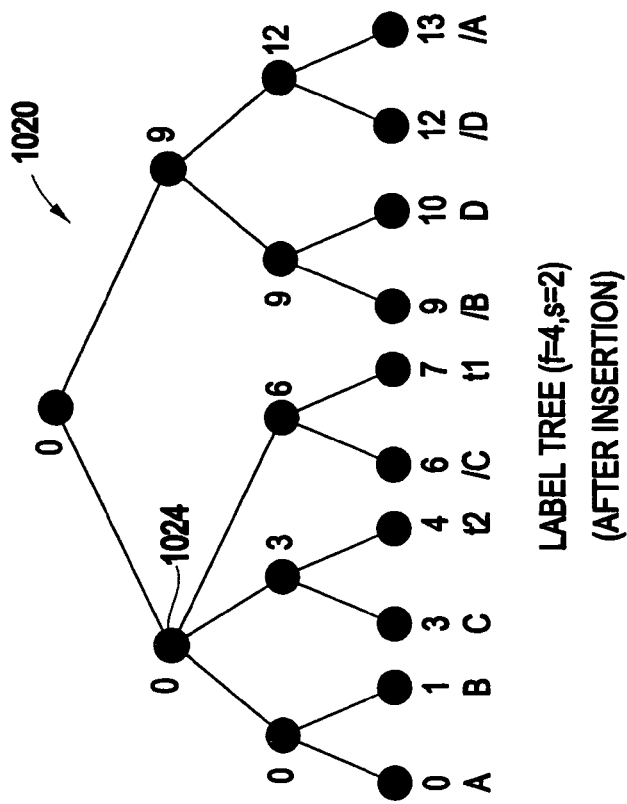
Figure 10C:
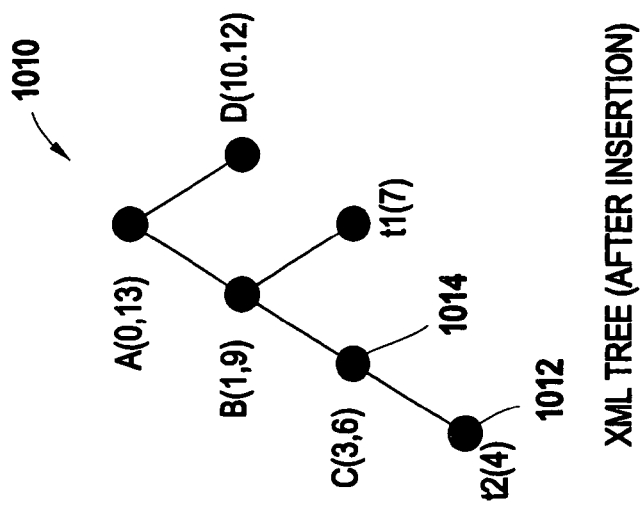

As an example, if an exemplary embodiment of the present invention inserts a text node "t2" 1012 as the first child of node "C" 1014 as shown in FIGS. 10A and 10C, then that insertion corresponds to a leaf insertion after a leaf marked "C" 1014 in the label tree 1010 as shown in FIGS. 10B and 10D. This insertion may then result in a split of node labeled "3" 1022 of height 1 to two complete binary trees, and subsequent re-labeling of all the descendents of the splitting node's parent 1024 (node 0). The changes of the labels in the label tree 1020 shown in FIG. 10D are reflected in the labels of XML tree 1010 of FIG. 10C. Note that all the leaves in the label tree 1010 of FIG. 10D are still at the same level.

If, in step S820 the control routine determines that the root node itself will need to split, although this happens very rarely, the control routine continues to step S830 where a new root is created by the control routine. The control routine then continues to step S850 where the control routine re-labels the whole label tree and the height of the label tree increases by one.

The intuition behind the splitting and subsequent re-labeling that happens in an exemplary embodiment of the present invention after an insertion is that if the insertion causes the number of leaves of some sub-tree to increase too much, this means that the labels of these leaves have become very dense.

To remedy the situation of the labels becoming too dense, an exemplary embodiment of the present invention splits the sub-tree and re-labels the nodes of the sub-tree to provide more slack for this portion. In this manner, insertions in this portion of the tree may be accommodated.

Since, in an exemplary embodiment of the present invention, the number of leaves of any sub-tree is controlled and the density of the labels is also controlled, the number of nodes involved in re-labeling amortized over several insertions may also be controlled.

While this detailed description focuses on XML insertions, deletions can also be handled by marking as "deleted" the corresponding leaves in the label tree without any re-labeling. In this manner, an exemplary embodiment of the present invention can reuse the labels of the deleted leaves for subsequent insertions. The insertion into a deleted leaf may be accomplished as follows: whenever a node x satisfies the splitting criterion, before an exemplary embodiment of the present invention actually splits node x, the sub-tree for node x is examined to determine if that sub-tree has any deleted leaves. If the sub-tree does have deleted leaves, a new leaf may be inserted in that sub-tree.

The following describes the properties of a label tree in accordance with an exemplary embodiment of the present invention.

For any internal node x:

$$(f/s)^{h(x)} \leq 1(x) < s \cdot (f/s)^{h(x)}; \text{ and} \tag{6}$$

$$f/s \leq c(x) \leq f \tag{7}$$

One data structure used traditionally in data management systems is a B-tree. A B-tree is a balanced data structure that may provide for efficient searching for keys in a database management system. By comparison, a label tree in accordance with an exemplary embodiment of the present invention is similar to a B-tree in that it may guarantee a certain occupancy of the internal nodes such that the tree is balanced dynamically and the height is bounded by O(logn), where n is the number of nodes in the tree. However, some of the differences are:

1. The purpose of a B-tree is to speed up a query. It locates a node in a top-down fashion search. In contrast, a purpose of a label tree in accordance with an exemplary embodiment of the present invention is to assign a label for a newly inserted node which reflects the relative order of nodes in the XML document and, thus, speeds up regular expression queries;
2. The splitting criterion of the label tree may be based on the number of leaves a node has, rather than the number of children; and
3: For each internal node x in an exemplary label tree in accordance with the present invention:

$$f/s \leq c(x) \leq f \tag{8}$$

while for B-trees, s is fixed to 2.

An exemplary embodiment of the present invention also may avoid cascade splitting where splitting of one node causes another to node split.

We can infer the meaning of parameters f and s from the splitting algorithm explained above, where
f defines the maximum fanout of the label tree, and
s determines the number of sub-trees created after a split.
The inventors call this factor the "split factor."

Both of these parameters contribute to the shape of the tree. An exemplary method for assigning values to f and s will be described below.

For purposes of comparison with other labeling schemes, the following description analyzes the costs associated with an exemplary embodiment of the labeling scheme in accordance with the present invention, in terms of time and space requirements.

Since disk accesses may be several orders of magnitude slower than CPU computations, the cost as the number of disk accesses are measured, as in a traditional database performance analysis.

Furthermore, it may be assumed that the entire label tree is stored on disk and, for simplicity, no assumptions are made about nodes being cached. In practice, many higher-level nodes may be cached most of the time, much like in the case of B-trees, so these estimates are pessimistic. So, the cost is measured as the number of nodes accessed for searching or re-labeling.

For queries, an exemplary embodiment of the label tree in accordance with the present invention does not incur any additional cost. In fact, if the labels are stored along with the XML nodes, the label of a given node may be retrieved without additional cost.

The amortized cost for an insertion to an XML tree of size n is:

$$\text{cost}(f, s, n) \leq \frac{1 + \frac{2f}{s-1}}{\log \frac{f}{s}} \cdot (\log n + 1) + f - 1 \tag{9}$$

The maximum number of bits, which may be required to encode a label is:

$$\text{bits}(f, s, n) = \frac{\log(f-1)}{\log(f/s)} \cdot (\log n + 1) \tag{10}$$

The above represent the worst-case amortized cost for one insertion and the number of bits needed as a function of the current number of nodes in the XML tree. Since f and s may be constant parameters, the labels of the nodes of the XML tree may be maintained with O(log n) bits and O(log n) amortized insertion cost.

O(log n) may be the worst case lower bound for update cost. Since the cost may be measured as the number of disk accesses, even a reduction by a constant factor is helpful. Similarly, constants may be important for the number of bits required. So, the insertion cost can be minimized by choosing the optimum values for f and s.

Given an expected final size n of an XML document, parameters f and s may be set according to different application needs to optimize the constant factors of the cost and bits.

For example, to minimize cost:

$$\text{object:Min(cost)} \tag{11}$$

The critical points of the function "cost" may be found by solving the following equations:

$$\frac{\partial \text{cost}}{\partial f} = 0; \text{ and} \tag{12}$$

$$\frac{\partial \text{cost}}{\partial s} = 0 \tag{13}$$

For a given n, the above equations are solved to get the value of $f_0$ and Evaluating the second derivative at the point $(f_0, s_0)$, we find out if the solution is the minimum.

If the maximum number of bits B which are permitted is constrained, the optimization problem becomes:

$$\text{object:min(cost)} \tag{14}$$

$$\text{subject to:bits} \leq B \tag{15}$$

This is a problem of optimization under inequality constraints. First, unconstrained function cost is minimized. If the global minimum satisfies the inequality constraints, then $(f_0, s_0)$ is the desired answer. Otherwise the minimum must be located "on the line." That is, the local minimum should be achieved when the inequality constraints are active. The optimization problem under inequality constraints may be converted to an optimization problem under equality constraints, as follows:

$$\text{object:min(cost)} \tag{16}$$

$$\text{subject to:bits}-B=0 \tag{17}$$

The Lagrange multiplier theory may be followed to solve this problem. A Lagrange multiplier μ is introduced to form a new function:

$$G(f,s,n)=\text{cost}(f,s,n)+\mu\cdot\text{bits}(f,s,n) \quad (18)$$

The values of f, s and μ which give the conditional minima of cost are found by solving the following equations:

$$\frac{\partial g}{\partial f} = 0 \text{ and } \frac{\partial g}{\partial s} = 0 \text{ and } \text{bits} - B = 0 \quad (19)$$

If the number of bits, which are used to encode labels, is less than the machine word size, the label comparisons for queries are done by the hardware and are, therefore, very fast. This is recommended for most cases.

Occasionally, when n is very large, and the number of bits needed is more than the machine word size, the number comparison should be done by the software. In this case, the time needed for comparison is proportional to the number of bits, which are used. So, the overall cost for both queries and updates needs to be minimized.

In this case, the proportion of queries versus updates, say, λ and 1−λ should be known. The number of label comparisons needed for each query is proportional to the size of the document that may be denoted by t·n, where t is a constant.

Let $c_w$ be the cost to compare two numbers of machine word size w, then the cost to compare two numbers with b bits is $c_w \cdot \lceil b/w \rceil$. Also, let d be the cost of one disk access. Then, the total cost is:

$$\text{TotalCost}=\lambda\cdot t\cdot n\cdot c_w\cdot\lceil\text{bits}(f,s,n)/w\rceil+(1-\lambda)\cdot(d+\lceil\text{bits}(f,s,n)/m\rceil$$

$$\cdot c_w)\cdot\text{cost}(f,s,n) \quad (20)$$

To minimize the overall cost, we need to solve the following equations:

$$\frac{\partial \text{TotalCost}}{\partial f} = 0 \text{ and } \frac{\partial \text{TotalCost}}{\partial s} = 0 \quad (21)$$

In general, XML insertions involve a list of atoms (tags and text segments) at one time. Although such an insertion can be implemented as a sequence of independent leaf insertions in the label tree, the question is whether that can be done cheaper by inserting multiple leaves in label tree at the same time? The answer is yes. The total cost of inserting p atoms in batch mode can be shown to be bounded by:

$$\text{cost}(f,s,p)=(h+f-1)/p+2f/(s-1)\cdot(h-h_1+2) \quad (22)$$

where $h_1$ is the largest number such that:

$$(s-1)\cdot(f/s)^{h_1}\leq p \quad (23)$$

The above exemplary embodiment of present invention provides a labeling scheme which uses O(log n) bits to achieve O(log n) amortized update cost and constant query cost. A second exemplary embodiment of the present invention improves the update cost with a multiple-level labeling scheme.

For example, the second exemplary embodiment of the present invention follows a two-level labeling scheme. The second exemplary embodiment of the present invention partitions the label tree into 2 parts such that the second part includes all the leaves and the first part includes the rest. Each leaf of the first part has log n children, which belong to the second part and correspond to the tags of the XML data. The first part is constructed according to label tree construction algorithm described above.

The labels of the nodes of height h=1 are maintained using the label tree algorithm. Within each node x of height h=1, the second exemplary embodiment of the present invention assigns a label to each of the children of node x in a monotonically increasingly process, such that the order of the children is maintained within its parents. The label of a leaf the may be called the second level label.

Upon a leaf insertion, let x be the parent of the inserted node, if the number of leaves of x does not exceed log n, only the second level labels need to be updated without any effect on the first level label.

With O(log n) bits, a label can be assigned to the newly inserted node without re-labeling any of its siblings. Otherwise, if x has log n children after the insertion, node x may be split into two nodes x and x' node x's children are uniformly distributed over these two nodes. Then the second exemplary embodiment of the present invention inserts node x' as a sibling of node x following the insertion algorithm of the label tree described above.

Although some re-labeling happens to the first level labels, the second level labels remain unchanged except those of node x's children. So, the amortized cost of maintaining the first level labels is still O(log n). Notice that since this cost is charged to node x's (log n)/2 newly inserted children, each leaf has an amortized update cost of O(1).

In order to compute the relative order of two leaves, the label tree is traversed upward to retrieve the label of the parent of each leaf and to compose the complete label as a concatenation of a first level label with a second level label and the complete labels are compared.

Although this second exemplary embodiment of the present invention achieves better update performance, the query performance may decrease. If the single-level labeling scheme is used, the labels may be stored together with the data, such that the label may be retrieved for free during queries. If the two-level labeling scheme is used, only the second level label may be stored with the XML data. To compare the order of two tags, their parent's labels (i.e. the first level label) will need to be retrieved by two disk accesses unless the label tree can be kept in memory.

Therefore, there is a tradeoff of the multi-level labeling scheme, since re-numberings can be done locally, the update cost decreases. However, since the complete label does not propagate to the leaves the label tree needs to be traversed upward for each label comparison which slows down the query processing. So, unless the label tree can be kept in memory, multiple level labeling may slow down the query.

As an alternative to storing the label tree on disk, only the leaf labels (with the XML nodes) may be stored because all the structural information of the label tree is implicit in the labels themselves. Indeed, any leaf label is of the form:

$$N(x)=i_0+i_1(f-1)^1+i_2(f-1)^2+\ldots+i_{h-1}(f-1)^{h-1} \quad (24)$$

Where:

$i_0$ is the relative position of node x in its siblings list, and $i_1$ is x's parent's position among its siblings.

In other words, the base (f−1) digits of N(x) provide the Dewey number of leaf node x. Based on this observation, the label tree incremental maintenance algorithm may be run without the label tree.

For example, in order to check if an internal node y satisfies the splitting criterion, it suffices to count how many leaf labels are in the range $[N(y), N(y)+(f-1)^{h(y)}]$. If the leaf labels are maintained in a B-tree whose internal nodes also maintain counts, such range queries may be executed efficiently (in logarithmic time).

Furthermore, once a splitting (virtual) node has been identified, the leaf labels corresponding to the s complete f/s-ary (virtual) trees can be computed easily and updated in place, on the labels identified by the range query.

Figure 11:
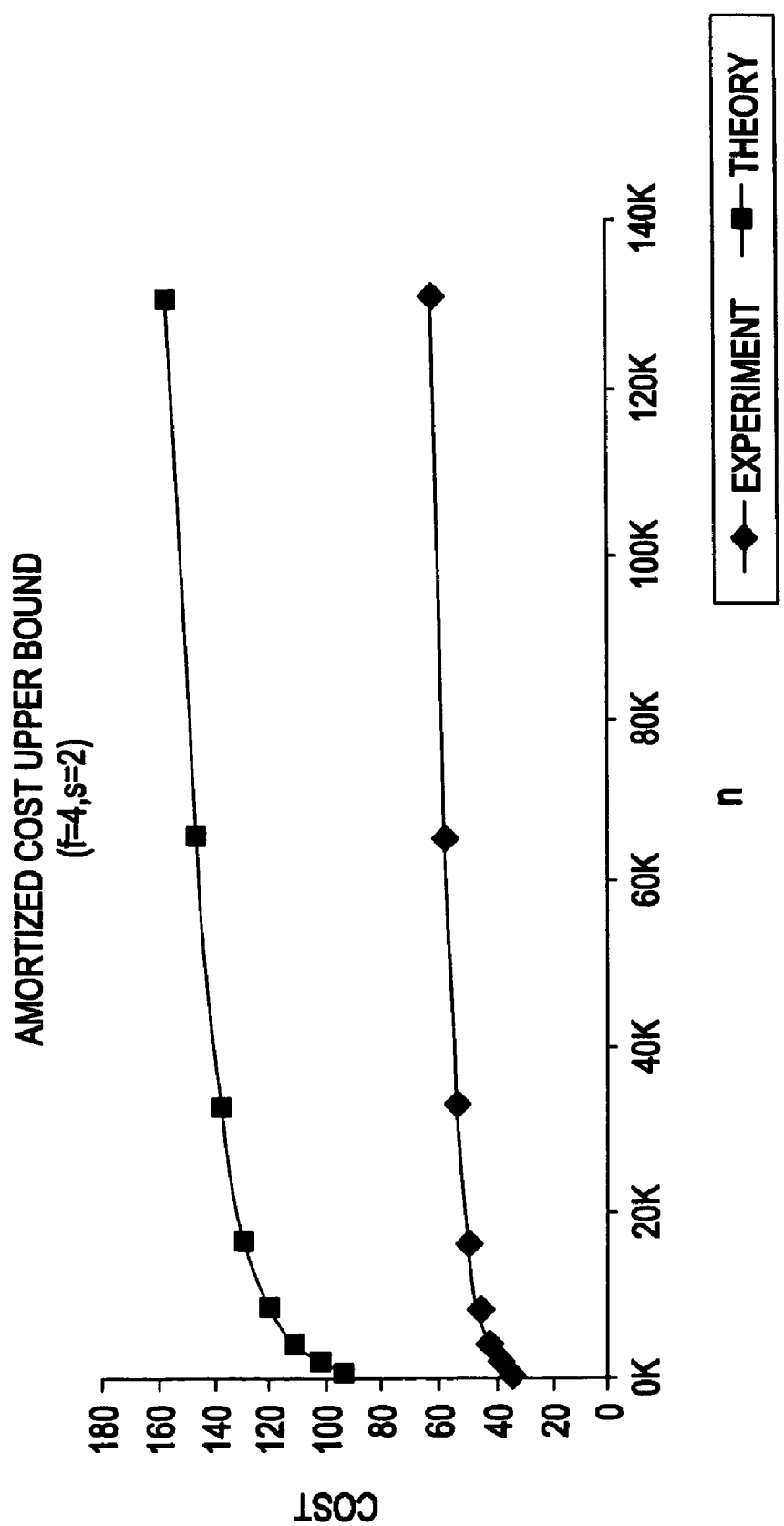
FIG. 11 is a graph that illustrates the amortized cost upper bound between experimental results and theoretical results.

The inventors conducted a series of experiments that verify the theoretical analysis. The experiments simulate a sequence of XML node insertions at random positions. The update cost is measured as the number of nodes that are relabeled or accessed during an insertion. FIG. 11 shows that for fixed values of the parameters f and s, the amortized update cost is logarithmic in the number of XML nodes in the document, as predicted by the theoretical worst case upper bound.

Figure 12:
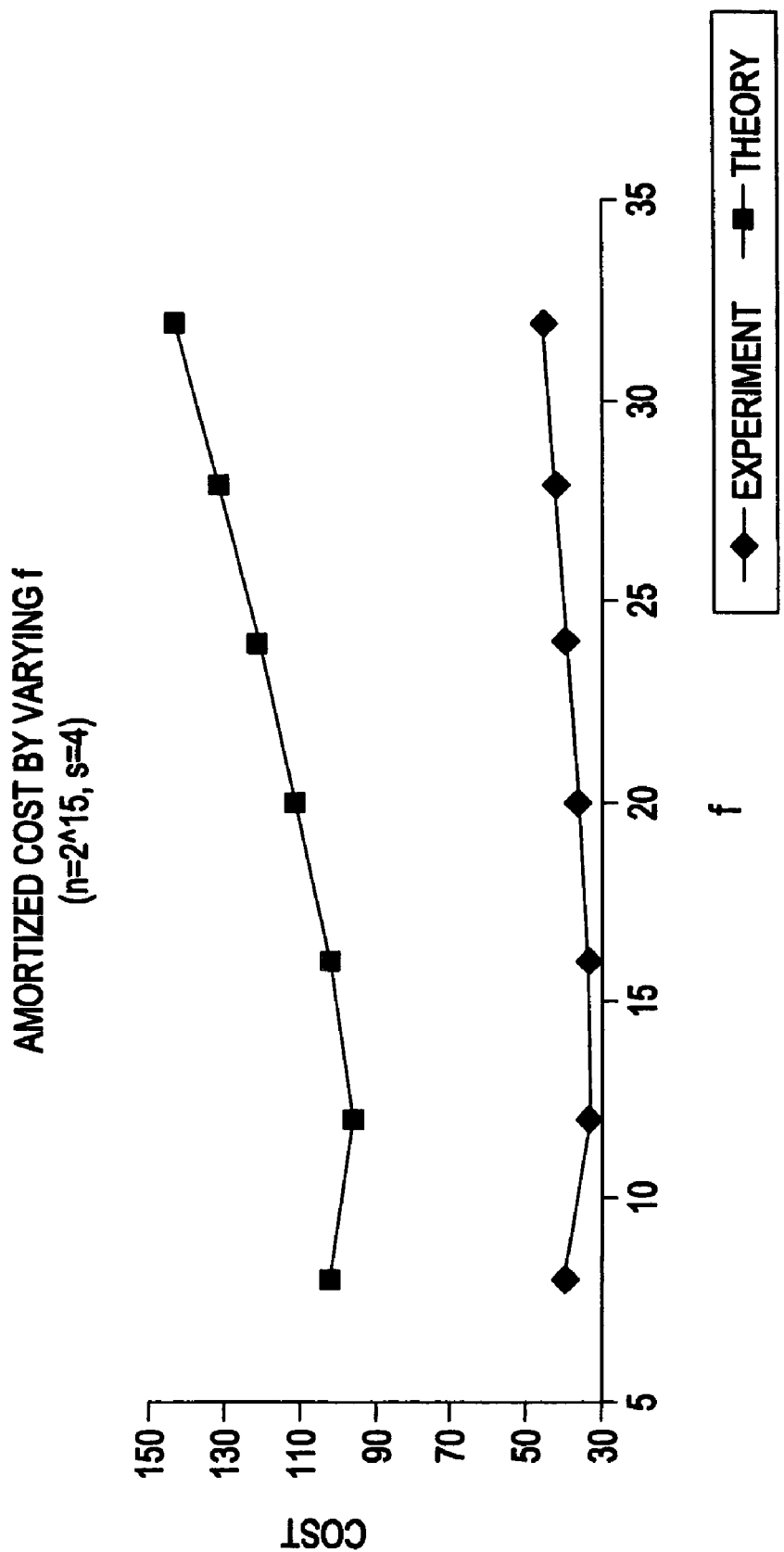
FIG. 12 is a graph that illustrates the amortized update cost for a fixed s and a varying f of experimental results and theoretical results.
Figure 13:
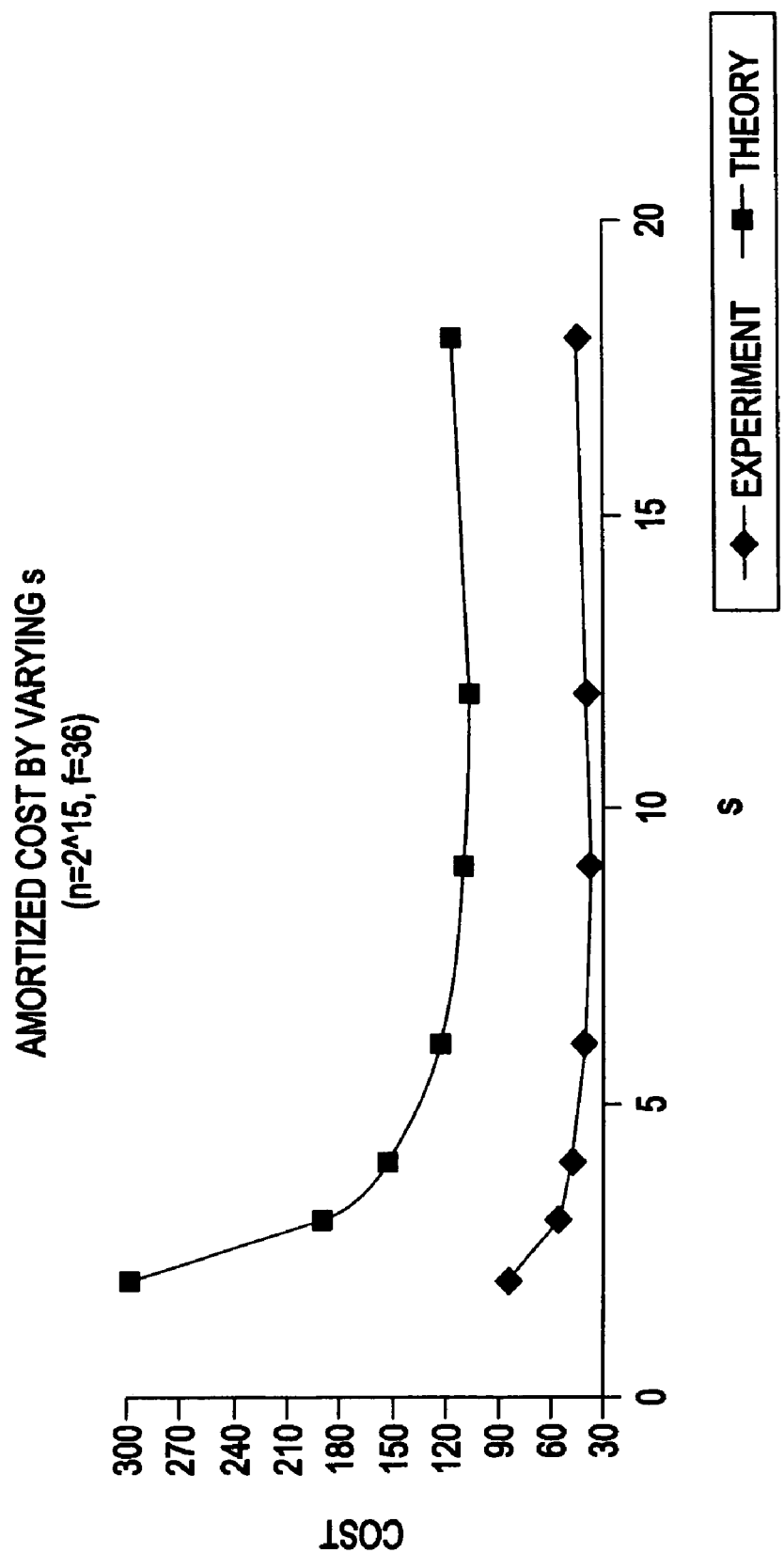
FIG. 13 is a graph that illustrates the amortized update cost that may be achieved by setting the values of s and a fixed f of experimental results and theoretical results.

FIGS. 12 and 13 show how the amortized cost changes as the value of f and s are changed, while keeping the other parameter and the size of the document unchanged.

Figure 14:
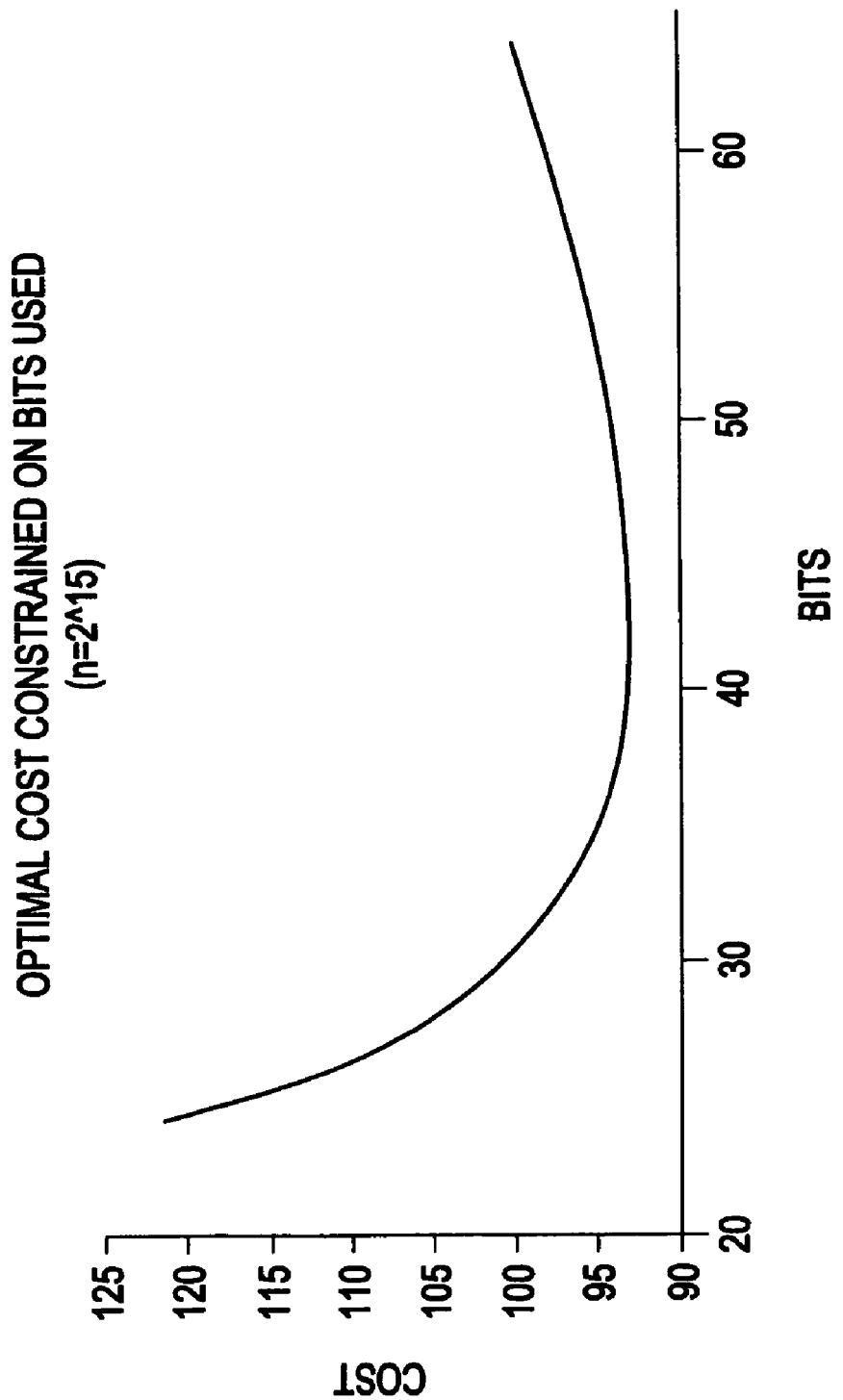
FIG. 14 is a graph that illustrates optimal cost with bit constraints.

FIG. 14 shows for a given number of bits, what is the minimal update cost that may be achieved by setting the values of f and s. This is useful to get the optimal update cost constrained by the number of bits being permitted. At first sight, it may seem strange because after a certain point, the cost starts to increase with the number of bits used. Although this result contradicts intuition, it's reasonable with the adopted model. To compute the worst-case upper bound with this model, assume that inserting a node causes its parent to be relabeled.

Since the range of numbers used to denote a node's children is thought as log(f) and no mechanism (say, label tree) is used to manipulate the labels of the children, the cost of re-labeling one's children is bounded by f. But if the number of bits being permitted is large enough, f bits may be used for the range of labels for one node's children, which eliminates the need to re-label a node if a new child is inserted.

The cost and the number of bits for this model is:

$$\text{cost} = \frac{1 + \frac{2s}{s-1}}{\log(f/s)} \cdot (\log n + 1) \quad (25)$$

$$\text{bits} = \frac{f}{\log(f/s)} \cdot (\log n + 1) \quad (26)$$

This model also provides an O(log n) update cost with O(log n) bits, although the constant of cost is reduced if more bits are needed. If the number of bits being permitted is O(n), then set f=n and achieve O(1) update cost.

The labeling scheme of the present invention maintains the order of data items within an XML document. An exemplary embodiment of the present invention uses an auxiliary data structure, called label tree, which helps assign and update labels to data items. Additional exemplary embodiments of the present invention provide algorithms both for the bulk loading and for the incremental maintenance of the label tree.

The present invention automatically adapts to uneven insertion rates in different areas of the XML document. For example, in areas with heavy insertion activity, the label tree adjusts itself by creating more slack between labels, to better accommodate future insertions.

Yet another exemplary embodiment of the present invention, distributes the re-labeling work required by a node split evenly for a number of insert operations, so as to eliminate any performance degradations.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method of maintaining the order of nodes in a hierarchical document, comprising:
    selecting a first parameter corresponding to a selected maximum fanout of an auxiliary ordered tree;
    selecting a second parameter corresponding to a selected number of sub-trees created after a split;
    building the auxiliary ordered tree having at least as many leaves as atoms within said hierarchical document based upon the first and second parameters;
    attaching the atoms to the leaves of said auxiliary ordered tree;
    labeling each of the nodes in the auxiliary ordered tree; and
    communicating the labeled nodes of the auxiliary ordered tree to a user
    wherein said labels comprise integer numbers having a size that is bounded by said first parameter and said second parameter.

2. The method of claim 1, wherein the labeling of the nodes in the auxiliary tree is defined by:

$N(\text{root})=0;$ $N(x)=N(y)+i \cdot (f-1)^{h(x)};$ and $0 \leq i < f$

Where:
N(x) is the label for node x;
x is the $i^{th}$ child of y;
f is the maximum number of children per node; and
h(x) is the height of node x.

3. The method of claim 1, further comprising assigning labels to the atoms in the hierarchical document based upon the labels assigned to the corresponding leaves in the auxiliary ordered tree.

4. The method of claim 1, further comprising storing the labels of the leaves of the auxiliary ordered tree.

5. The method of claim 4, further comprising storing the remaining portion of the auxiliary ordered tree.

6. The method of claim 1, further comprising partitioning the auxiliary ordered tree into a first portion that comprises the leaves from the auxiliary ordered tree and a second portion that comprises the remaining portion of the auxiliary ordered tree.

7. The method of claim 1, further comprising re-assigning labels to the atoms in the hierarchical document based upon the labels assigned to the colTesponding leaves in the auxiliary ordered tree.

8. A system for maintaining the order of nodes in a hierarchical document, comprising:
    means for selecting a first parameter corresponding to a selected maximum fanout of an auxiliary ordered tree;
    means for selecting a second parameter corresponding to a selected number of sub-trees created after a split;
    means for building the auxiliary ordered tree having at least as many leaves as atoms within said hierarchical document based upon the first and second parameters;

means for attaching the atoms to the leaves of said auxiliary ordered tree; and means for labeling each of the nodes in the auxiliary ordered tree, wherein said labels comprise integer numbers having a size that is bounded by said first parameter and said second parameter.

9. The system of claim 8, wherein the means for labeling each of the nodes bases the labeling upon:

$N(\text{root})=0;$ $N(x)=N(y)+i\cdot(f-1)^{h(x)};$ and $0 \leq \leq f$

Where:

N(x) is the label for node x;

x is the $i^{th}$ child of y;

f is the maximum number of children per node; and h(x) is the height of node x.

10. The system of claim 8, further comprising means for storing the labels of the leaves of the auxiliary ordered tree.

11. The system of claim 10, further comprising means for storing the remaining portion of the auxiliary ordered tree.

12. The system of claim 8, further comprising means for partitioning the auxiliary ordered tree into a first portion that comprises the leaves from the auxiliary ordered tree and a second portion that comprises the remaining portion of the auxiliary ordered tree.

13. The system of claim 8, further comprising means for re-assigning labels to the atoms in the hierarchical document based upon the labels assigned to the corresponding leaves in the updated auxiliary ordered tree.

14. A machine-readable data storage medium storing a program for making a computer maintain the order of nodes in an hierarchical document, the program comprising:

instructions for selecting a first parameter corresponding to a selected maximum fanout of an auxiliary ordered tree;

instructions for selecting a second parameter corresponding to a selected number of sub-trees created after a split;

instructions for building the auxiliary ordered tree having at least as many leaves as atoms within said hierarchical document based upon the first and second parameters; instructions for attaching the atoms to the leaves of said auxiliary ordered tree; and instructions for labeling each of the nodes in the auxiliary ordered tree, wherein said labels comprise integer numbers having a size that is bounded by said first parameter and said second parameter.

15. The medium of claim 14, wherein the instructions for labeling each of the nodes is based upon:

$N(\text{root})=0;$ $N(x)=N(y)+i\cdot(f-1)^{h(x)};$ and $0 \leq \leq f$

Where:

N(x) is the label for node x;

x is the $i^{th}$ child of y;

f is the maximum number of children per node; and h(x) is the height of node x.

16. The medium of claim 14, further comprising instructions for assigning labels to the atoms in the hierarchical document based upon the labels assigned to the corresponding leaves in the auxiliary ordered tree.

17. The medium of claim 14, further comprising instructions for storing the labels of the leaves of the auxiliary ordered tree.

18. The medium of claim 17, further comprising instructions for storing the remaining portion of the auxiliary ordered tree.

19. The medium of claim 14, further comprising instructions for partitioning the auxiliary ordered tree into a first portion that comprises the leaves from the auxiliary ordered tree and a second portion that comprises the remaining portion of the auxiliary ordered tree.

20. The medium of claim 14, further comprising instructions for re-assigning labels to the atoms in the hierarchical document based upon the labels assigned to the corresponding leaves in the updated auxiliary ordered tree.

* * * * *